(12) United States Patent
Fukai

(10) Patent No.: US 8,456,753 B2
(45) Date of Patent: Jun. 4, 2013

(54) ZOOM LENS BARREL AND IMAGE PICKUP APPARATUS HAVING THE SAME

(75) Inventor: Yosuke Fukai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/845,182

(22) Filed: Jul. 28, 2010

(65) Prior Publication Data
US 2011/0038058 A1 Feb. 17, 2011

(30) Foreign Application Priority Data
Aug. 17, 2009 (JP) ................................. 2009-188426

(51) Int. Cl.
*G02B 15/14* (2006.01)
(52) U.S. Cl.
USPC ............ 359/700; 359/699; 359/694; 359/823
(58) Field of Classification Search
USPC .................... 359/699–706, 694, 823; 396/53, 396/55, 72–73
See application file for complete search history.

(56) References Cited

U.S. PATENT DOCUMENTS

| 7,324,291 B2 | 1/2008 | Homme |
| 2006/0176587 A1 | 8/2006 | Homme |
| 2008/0180812 A1 * | 7/2008 | Honsho et al. ................ 359/700 |

FOREIGN PATENT DOCUMENTS

JP 2006-220898 8/2006

* cited by examiner

*Primary Examiner* — Scott J Sugarman
*Assistant Examiner* — Vipin Patel
(74) *Attorney, Agent, or Firm* — Cowan, Liebowitz & Latman, P.C.

(57) ABSTRACT

A lens barrel capable of achieving a smooth zoom operation and reducing a driving load at the time of barrel retraction. The lens barrel includes a rectilinear guide cylinder rectilinearly moving in an optical axis direction, and a movable cam cylinder moving in the optical axis direction while rotating relative to the guide cylinder. The guide cylinder is formed at its inner peripheral surface with a cam groove and a rectilinear guide groove that divides the cam groove at a boundary between a retracted region and a photographing region, and is formed with a penetration cam groove extending from the inner peripheral surface to an outer peripheral surface of the guide cylinder. The movable cam cylinder moves in the photographing region while the first pin engages the cam groove, and moves in the retracted region while the second pin engages the penetration cam groove.

6 Claims, 14 Drawing Sheets

ZOOM LENS BARREL AND IMAGE PICKUP APPARATUS HAVING THE SAME

BACKGROUND OF THE INVENTION

1. Field of the Invention

The present invention relates to a lens barrel capable of zoom operation, and relates to an image pickup apparatus such as a digital camera having the lens barrel.

2. Description of the Related Art

Some conventional zoom lens barrel includes a fixed cylinder having an inner peripheral surface thereof formed with cam grooves, a cam cylinder having cam pins for engagement with the cam grooves of the fixed cylinder, and a lens retainer having cam pins for engagement with cam grooves formed on an inner peripheral surface of the cam cylinder. The cam cylinder moves along an optical axis direction while rotating. With rotation of the cam cylinder, the lens retainer relatively moves in the optical axis direction for zooming and retracting operations.

With recent trend that image pickup apparatuses are made smaller in thickness and higher in magnification, the zoom lens barrel of the above construction has rectilinear guide grooves for causing the lens retainer to rectilinearly move in the optical axis direction. The rectilinear guide grooves are formed on the inner peripheral surface of the fixed cylinder so as to extend across and divide the cam grooves formed on the fixed cylinder.

However, the rectilinear guide grooves formed in this manner cause a fear that the cam pins of the lens retainer are disengaged from the cam grooves of the fixed cylinder at positions where the cam grooves are divided by the rectilinear guide grooves, or that the cam pins or the cam grooves are worn.

Thus, a zoom lens barrel has been proposed in which first and second cam grooves used in respective ones of a photographing region and a non-photographing region are formed on the inner peripheral surface of the fixed cylinder and in which first and second cam pins for engagement with respective ones of the first and second cam grooves are formed on the outer peripheral surface of the cam cylinder (Japanese Laid-open Patent Publication No. 2006-220898).

This proposal contemplates to smoothly drive the zoom lens barrel by engaging the second cam pins with the second cam grooves not divided by the rectilinear guide grooves when the first cam pins are at positions where the first cam grooves are divided by the rectilinear guide grooves.

However, this lens barrel causes a fear that the cam pins are caught in cam groove entrances at the time of switching between the retracted region and the photographing region so that the zoom operation is adversely affected. In addition, a relatively large driving load is applied to the lens barrel at the time of barrel retraction and at the time of photographing since the cam pins are in engagement with the cam grooves both in the retracted region and in the photographing region.

SUMMARY OF THE INVENTION

The present invention provides a lens barrel and an image pickup apparatus, which are capable of achieving a smooth zoom operation and reducing a driving load at the time of barrel retraction.

According to a first aspect of this invention, there is provided a lens barrel comprising a rectilinear guide cylinder configured to rectilinearly move in an optical axis direction, the rectilinear guide cylinder having at least one cam groove formed on an inner peripheral surface thereof, at least one penetration cam groove extending from the inner peripheral surface to an outer peripheral surface thereof, and at least one rectilinear guide groove extending in the optical axis direction and dividing the cam groove at a boundary between a retracted region and a photographing region, and a movable cam cylinder configured to move in the optical axis direction while rotating relative to the rectilinear guide cylinder, the movable cam cylinder having at least one first pin that engages the cam groove and at least one second pin that engages the penetration cam groove, wherein the movable cam cylinder moves in the photographing region while the first pin engages the cam groove, and moves in the retracted region while the second pin engages the penetration cam groove.

According to a second aspect of this invention, there is provided an image pickup apparatus which comprises the lens barrel according to the first aspect of this invention.

With this invention, it is possible to achieve a smooth zoom operation of the lens barrel having the rectilinear guide cylinder formed with at least one guide groove and at least one rectilinear guide groove extending across and dividing the cam groove and to reduce a driving load at the time of barrel retraction.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
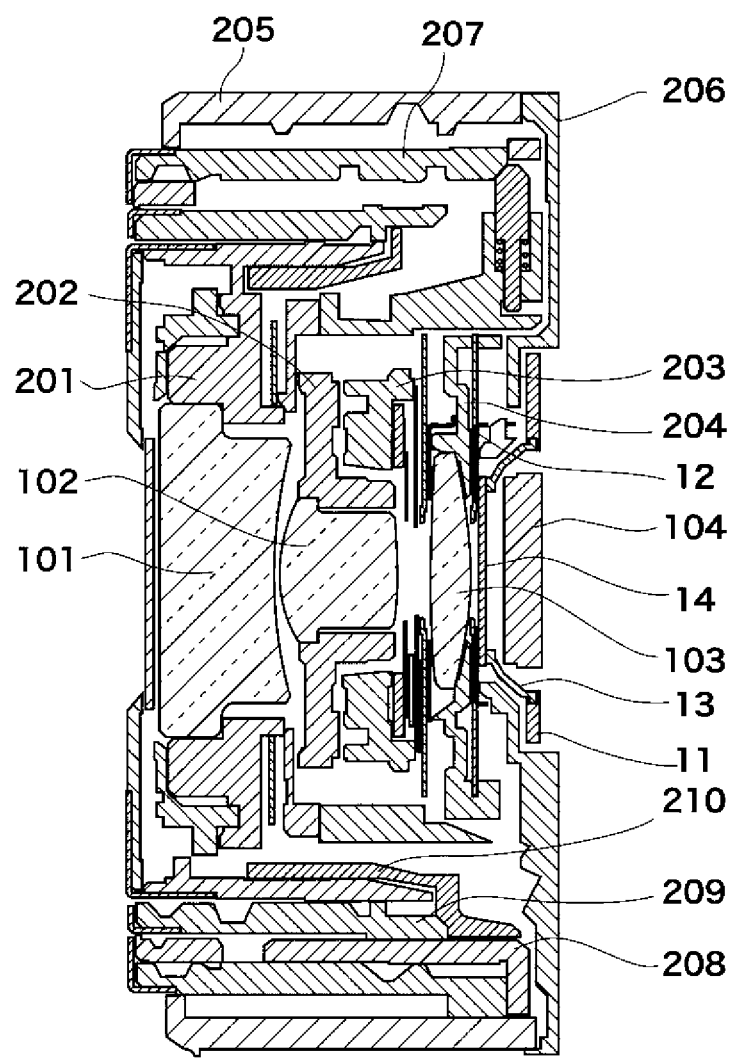
FIG. 1 is a section view showing a lens barrel according to one embodiment of this invention in a retracted state.
Figure 2:
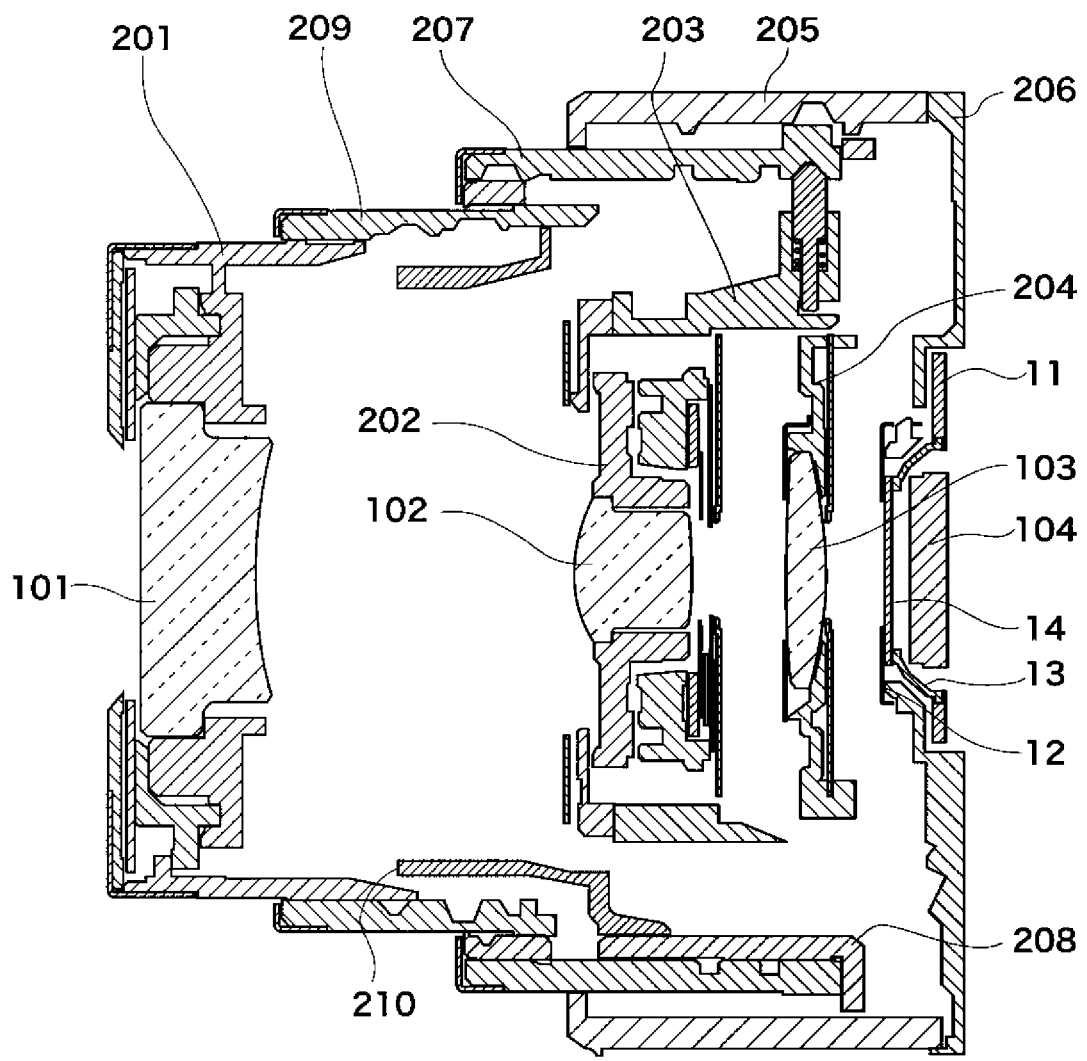
FIG. 2 is a section view showing the lens barrel in a WIDE state.
Figure 3:
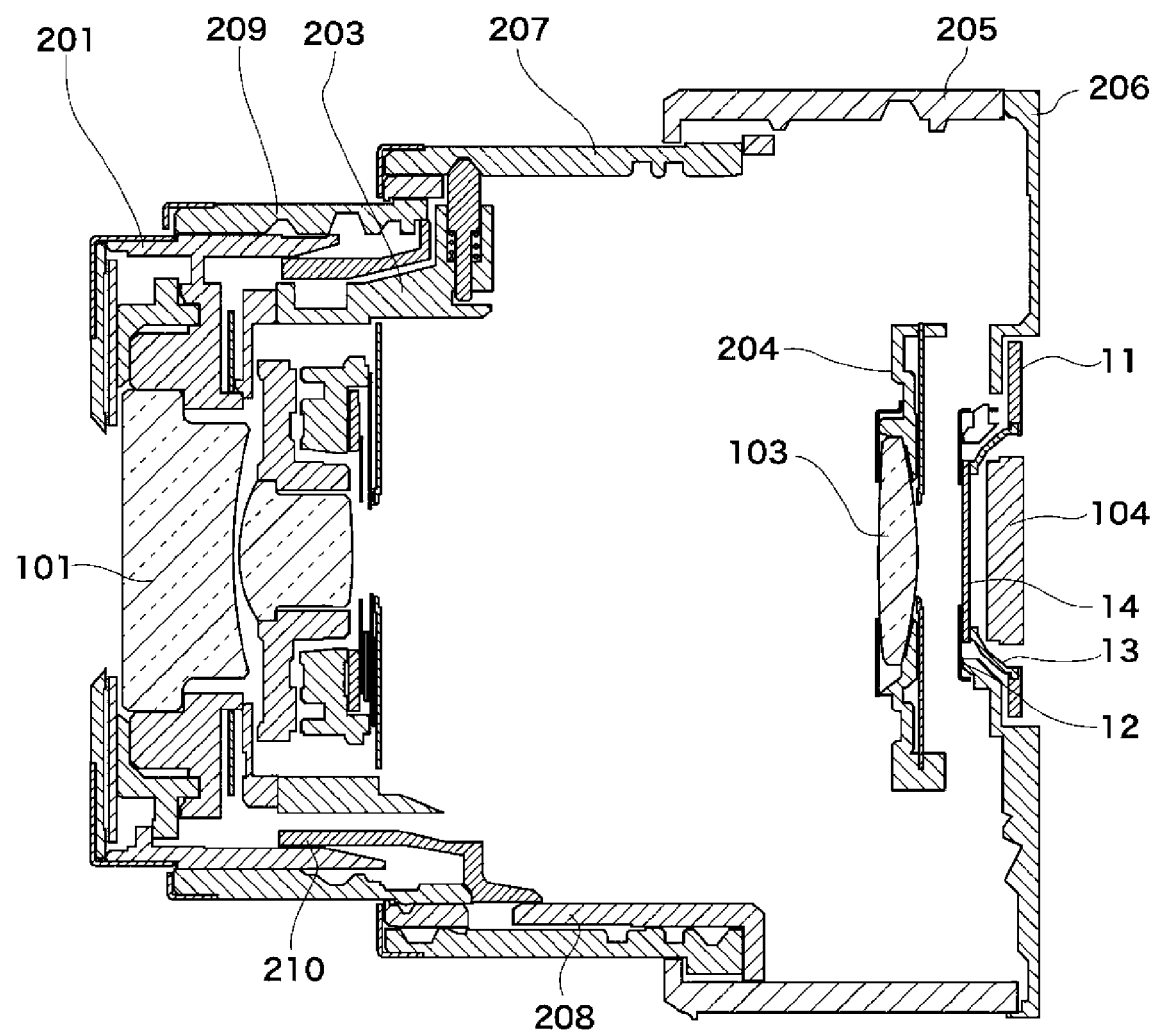
FIG. 3 is a section view showing the lens barrel in a TELE state.
Figure 4:
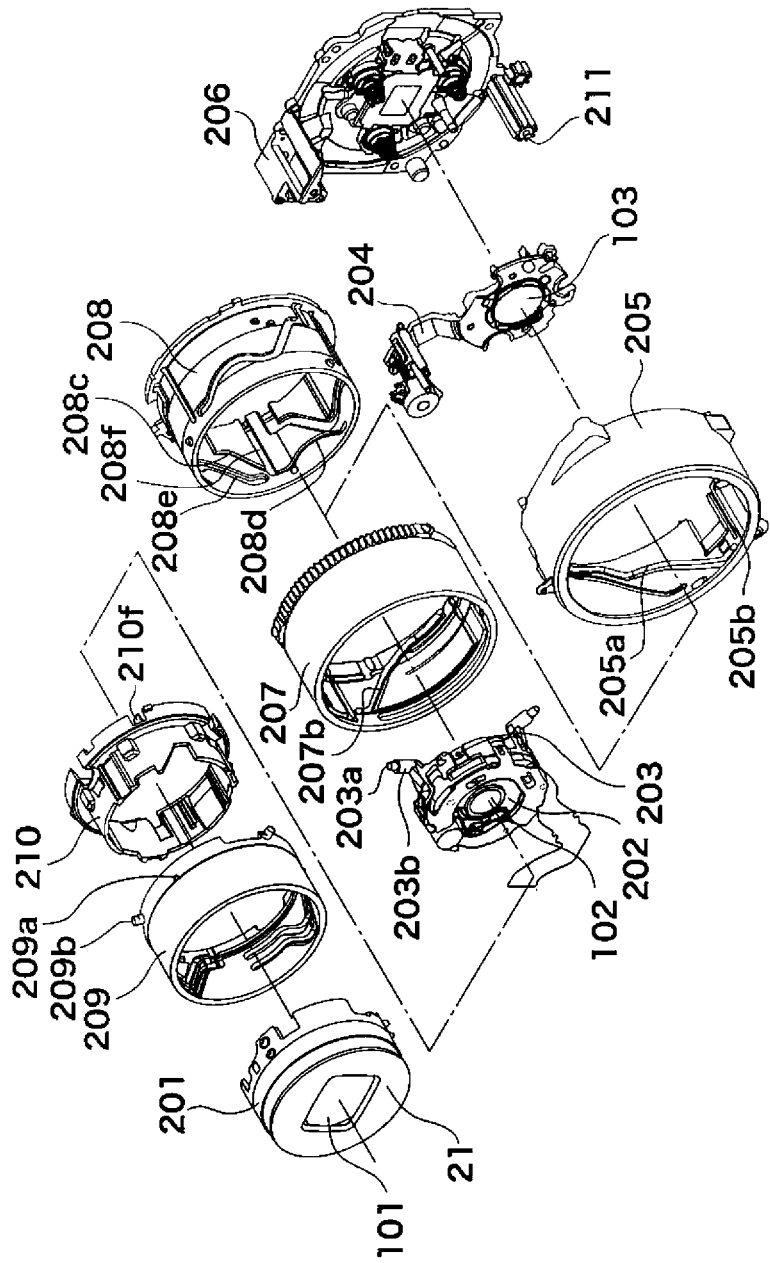
FIG. 4 is an exploded perspective view of the lens barrel.
Figure 5:
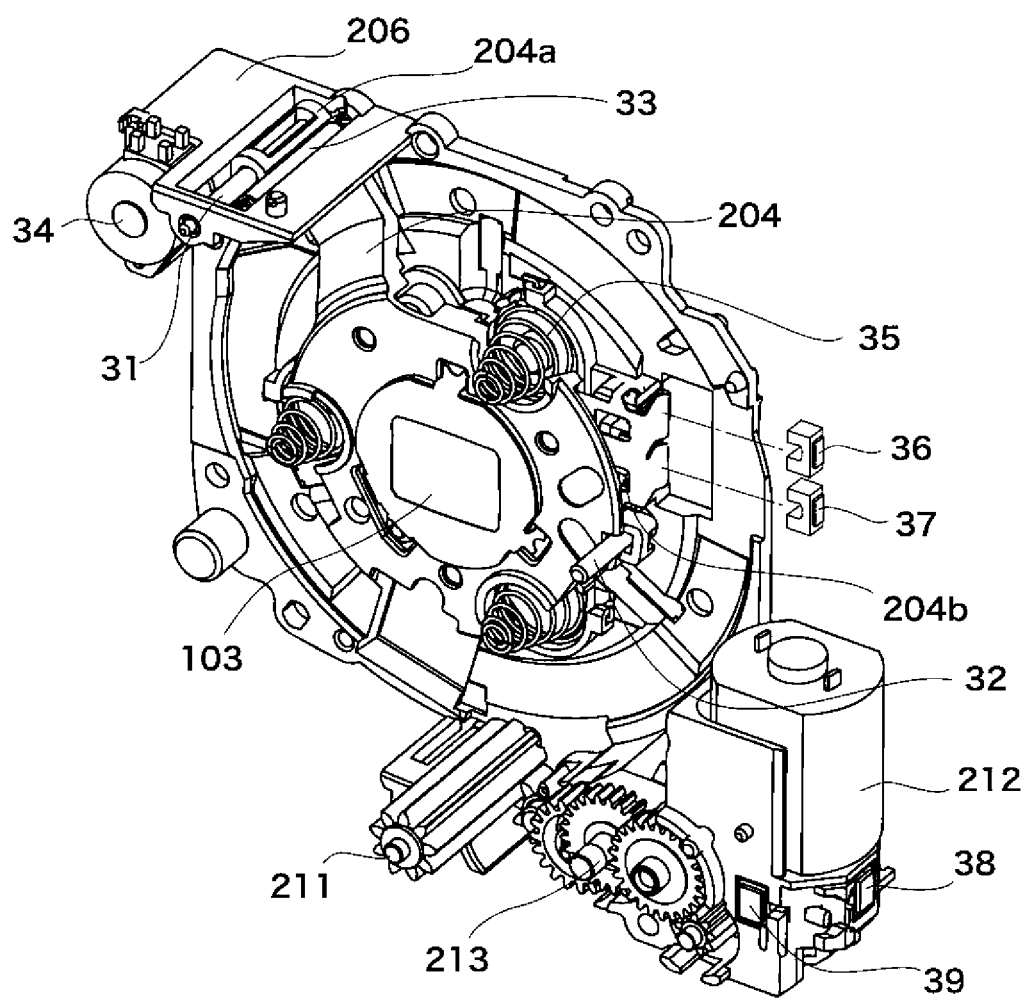
FIG. 5 is a perspective view showing an assembly of a CCD holder and a third group barrel of the lens barrel.

FIGS. 1 to 3 show in section view a lens barrel according to one embodiment of this invention in a retracted state, in a WIDE state, and in a TELE state, respectively. FIG. 4 shows the lens barrel in exploded perspective view, and FIG. 5 shows in perspective view an assembly of a CCD holder and a third group barrel of the lens barrel.

The lens barrel of this embodiment is configured as a zoom lens barrel adapted to be mounted on an image pickup apparatus such as a digital camera. The lens barrel includes a first group barrel 201 that holds a first lens group 101, a second group unit (hereinafter, denoted by reference numerals 202, 203) including a second group holder 202 that holds a second lens group 102 and a second group base 203 that has an aperture and a shutter, and a third group barrel 204 that holds a third lens group 103.

The first group barrel 201 and the second group unit 202, 203 are a zooming system lens group. The second group unit includes an anti-shake mechanism for correcting hand shake at the time of photographing or the like. The third group barrel 204 is a focus lens group for focusing on the object.

The lens barrel includes a fixed cam cylinder 205, CCD holder 206, first movable cam cylinder 207, first rectilinear guide cylinder 208, second movable cam cylinder 209, and second rectilinear guide cylinder 210.

The CCD holder 206 is fastened to the fixed cam cylinder 205. A CCD sensor 104 is mounted to the CCD holder 206 via a CCD plate 11. An optical filter 14 is disposed on the object side of the CCD sensor 104 and interposed between a CCD mask 12 and a CCD rubber 13.

As shown in FIG. 5, photo interrupters 36, 37 for detecting initial lens positions at zooming and focusing are attached to the CCD holder 206. A zoom motor 212 is fixed to the CCD holder 206, and a rotational driving force of the motor 212 is conveyed to a gear 211 via a gear train 213. Pulses generated by the zoom motor 212 are counted by photo interrupters 38, 39. The details of the photo interrupters 36-39 will be described later.

The third group barrel 204 is supported by the CCD holder 206 so as to be movable in the optical axis direction. Specifically, an AF guide shaft 31 extending parallel to the photographing optical axis and slidably fitted to a guide hole 204a formed in the third group barrel 204 is press-fitted and fixed to the CCD holder 206. A sub-guide shaft 32 for rotation restriction is integrally formed with the CCD holder 206.

The third group barrel 204 is urged by an AF spring 33 toward the object side in the optical axis direction. On the object side of the third group barrel 204, there is provided an AF nut (not shown) that threadedly engages a screw (not shown) of an AF motor 34. With rotation of the screw of the AF motor 34, the third group barrel 204 is moved to advance and retreat in unison with the AF nut in the optical axis direction.

A light shield plate 204b is integrally formed with the third group barrel 204 and disposed to be movable to advance to and retreat from a slit portion of the photo interrupter 37. Springs 35 that urge the second group unit toward the object side in the optical axis direction at the time of barrel retraction are disposed at three places on the CCD holder 206.

Figure 6:
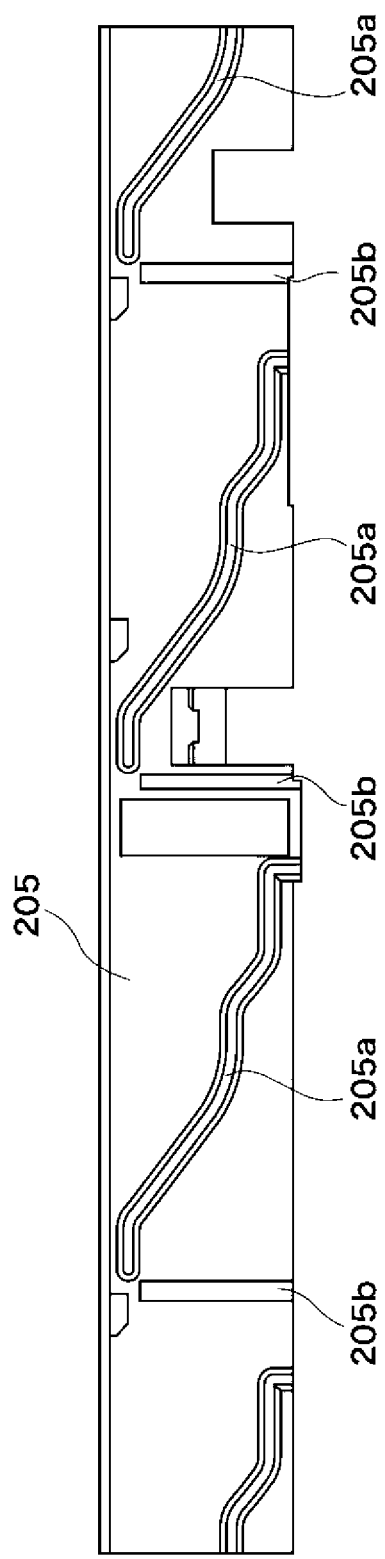
FIG. 6 is a development view of an inner peripheral surface of a fixed cam cylinder of the lens barrel.

FIG. 6 shows an inner peripheral surface of the fixed cam cylinder 205 in development view.

As shown in FIG. 6, cam grooves 205a are formed at circumferentially equal intervals at three places on the inner peripheral surface of the fixed cam cylinder 205, and rectilinear guide grooves 205b extending parallel to the optical axis are formed at three places on the cylinder 205.

The first movable cam cylinder 207 is disposed on the inner periphery side of the fixed cam cylinder 205, as shown in FIGS. 1 to 4. Three follower pins 207a (FIG. 12) that engage the cam grooves 205a of the fixed cam cylinder 205 are formed on the outer peripheral surface of the first movable cam cylinder 207 integrally therewith.

A gear portion 207g having gear tooth extending parallel to the photographing optical axis is formed on the outer peripheral surface of the first movable cam cylinder 207. When rotation of the gear 211 is conveyed to the gear portion 207g, the first movable cam cylinder 207 moves in the optical axis direction while being rotated by cam engagement between the follower pins 207a and the cam grooves 205a of the fixed cam cylinder 205.

Figure 7:
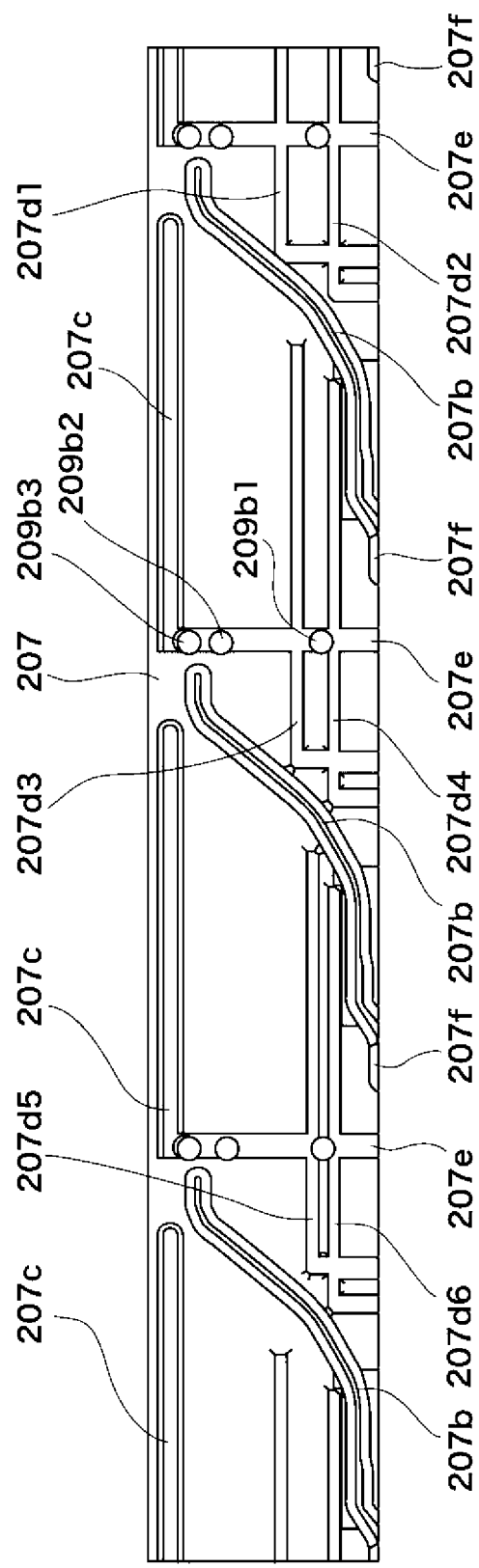
FIG. 7 is a development view of an inner peripheral surface of a first movable cam cylinder of the lens barrel.

FIG. 7 shows an inner peripheral surface of the first movable cam cylinder 207 in development view.

As shown in FIG. 7, second group cam grooves 207b along which the second group unit 202, 203 is moved in the optical axis direction are formed at circumferentially equal intervals at three places on the inner peripheral surface of the first movable cam cylinder 207.

A rear end portion (on the side remote from the object side) of a groove portion 207f of each second group cam groove 207b is omitted, whereby the entire length of the lens barrel at the time of barrel retraction can be shortened. A description of how the second group unit is held by the first movable cam cylinder 207 at the time of barrel retraction will be given later.

Cam grooves 207c extending in the circumference direction are formed at circumferentially equal intervals at three places on a front-end-side inner peripheral surface of the first movable cam cylinder 207.

Dual groove portions 207d1, 207d2; 207d3, 207d4; and 207d5, 207d6 extending in the circumference direction are formed at circumferentially equal intervals on a rear-end-side inner peripheral surface of the first movable cam cylinder 207.

A distance between the groove portions 207d1, 207d2 in the optical axis direction is set to be wider than a distance between the groove portions 207d3, 207d4 in the optical axis direction. The distance between the groove portions 207d3, 207d4 is set to be wider than a distance between the groove portions 207d5, 207d6 in the optical axis direction.

On the inner periphery side of the first movable cam cylinder 207, the first rectilinear guide cylinder 208 is disposed to be slidable relative to the cam cylinder 207 in the rotating direction (FIG. 1). In FIG. 7, reference numeral 207e denotes rectilinear driving grooves with which drive pins 209b of the second movable cam cylinder 209 are engaged, and reference numerals 209b1 to 209b3 denote positions of the drive pins 209b in the retracted state, in the WIDE state, and in the TELE state, respectively.

Figure 8:
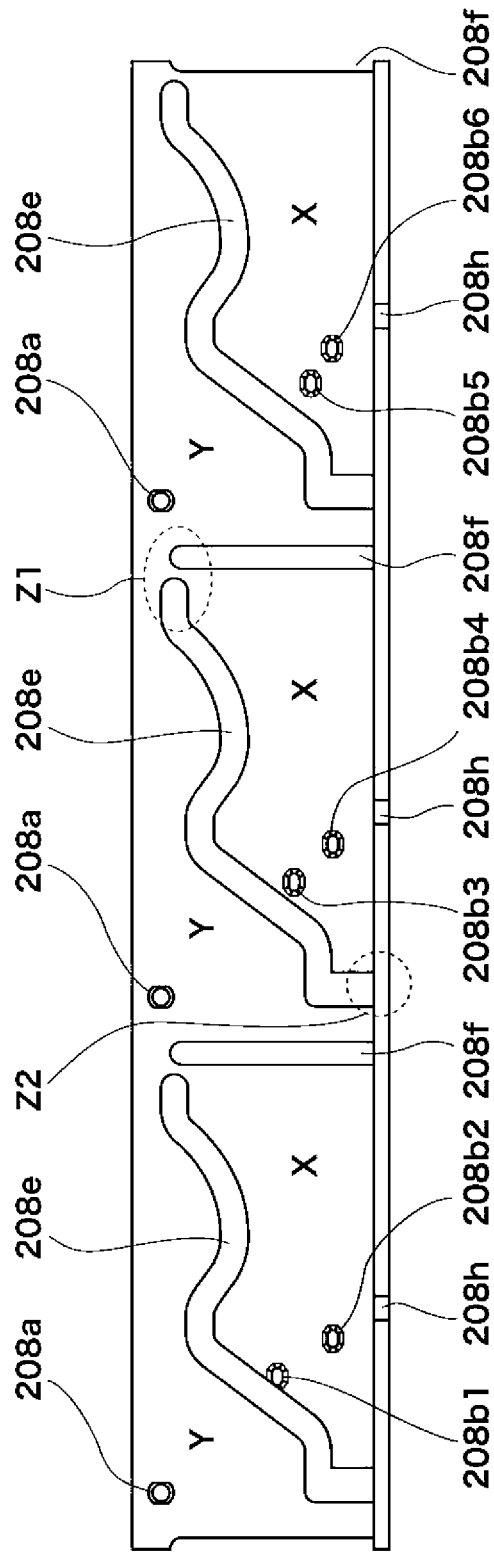
FIG. 8 is a development view of an outer peripheral surface of a first rectilinear guide cylinder of the lens barrel.

FIG. 8 shows an outer peripheral surface of the first rectilinear guide cylinder 208 in development view.

As shown in FIG. 8, penetration cam grooves 208e and first rectilinear guide grooves 208f are respectively formed at circumferentially equal intervals at three places on the first rectilinear guide cylinder 208. Taper pins 208a engaging the cam grooves 207c of the first movable cam cylinder 207 are formed at circumferentially equal intervals at three places on a front end portion of the first rectilinear guide cylinder 208.

The taper pins 208a of the first rectilinear guide cylinder 208 are engaged with the cam grooves 207c of the first movable cam cylinder 207, whereby play between the cam cylinder 207 and the guide cylinder 208 in the optical axis direction and in the radial direction can be eliminated and impact resistance can be improved.

Rectangular pins 208$b$1 to 208$b$6 corresponding to the groove portion 207$d$1 to 207$d$6 of the first movable cam cylinder 207 are projectingly provided on a rear end portion of the first rectilinear guide cylinder 208.

In FIG. 8, symbol X denotes regions of the guide cylinder 208 each surrounded by corresponding ones of the penetration cam grooves 208$e$ and the first rectilinear guide grooves 208$f$, and symbol Y denotes regions of the guide cylinder 208 each located on the front end side (object side) in the optical axis direction with respect to the corresponding penetration cam groove 208$e$. Since the penetration cam grooves 208$e$ and the first rectilinear guide grooves 208$f$ are formed around the regions X, the regions X supported at Z1 and Z2 portions are lower in impact resistance than the regions Y.

The taper pins 208$a$ are formed in the regions Y, and the rectangular pins 208$b$1-208$b$6 are formed in the regions X. The rectangular pins 208$b$2, 208$b$4, and 208$b$6 are disposed at the same position in the optical axis direction as one another. The rectangular pins 208$b$1, 208$b$3, and 208$b$5 are disposed at different positions in the optical axis direction from one another.

The groove portions 207$d$1-207$d$6 are each formed to have a width wider than that of a corresponding one of the rectangular pins 208$b$1-208$b$6. Accordingly, there is a gap in each of convex-concave fitting portions between the rectangular pins 208$b$1-208$b$6 and the groove portions 207$d$1-207$d$6.

When the first movable cam cylinder 207 moves in the optical axis direction, the rectangular pins 208$b$1-208$b$6 do not closely engage the groove portions 207$d$1-207$d$6. The rectangular pins 208$b$1-208$b$6, when applied with a falling impact or the like, therefore function as static-pressure receiving portions that ensure the impact resistance, without hindering a zoom operation of the lens barrel.

Figure 12:
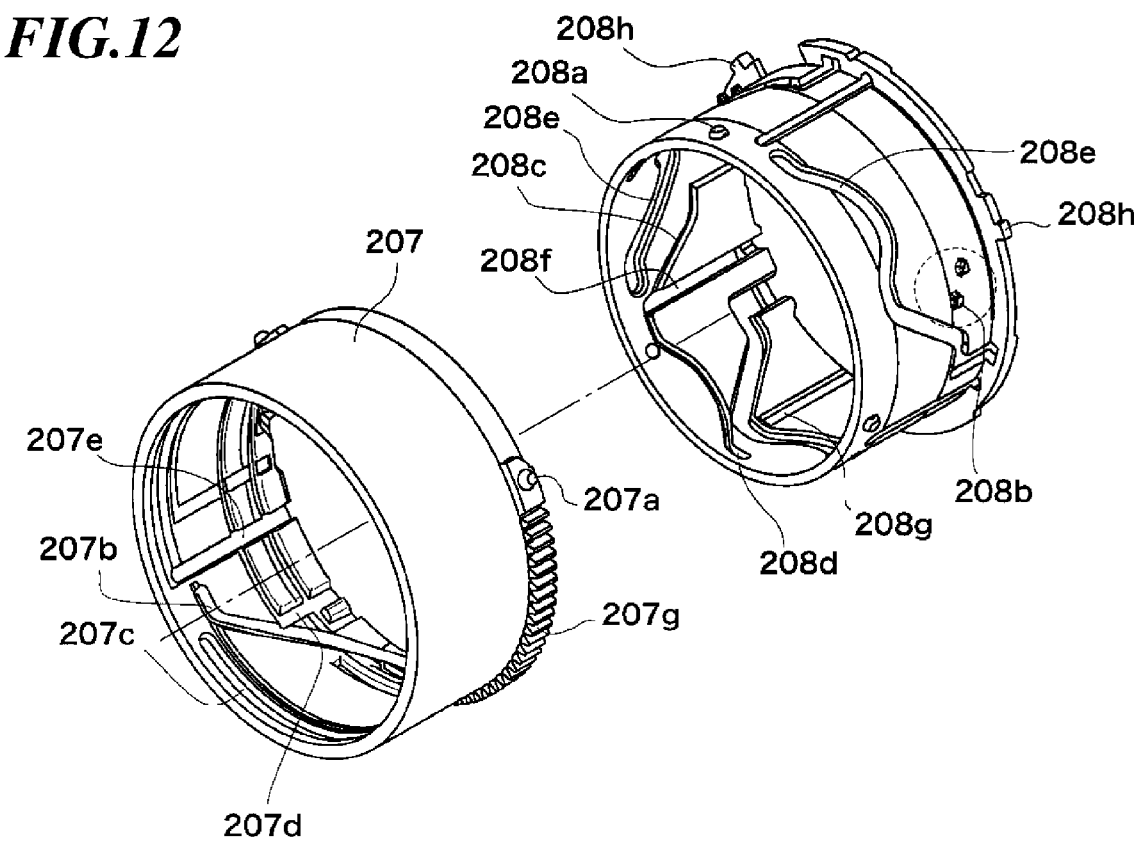
FIG. 12 is an exploded perspective view showing the first movable cam cylinder and the first rectilinear guide cylinder.

Rectilinear guide keys 208$h$ are formed at circumferentially equal intervals at three places on the outer periphery of the first rectilinear guide cylinder 208. These rectilinear guide keys 208$h$ are cam-engaged with the rectilinear guide grooves 205$b$ of the fixed cam cylinder 205, whereby rotation of the first rectilinear guide cylinder 208 is restricted when the guide cylinder 208 moves in the optical axis direction (FIGS. 5, 8, and 12).

Specifically, the first movable cam cylinder 207 is coupled to the first rectilinear guide cylinder 208, with reduced play in the optical axis direction and in the radial direction. When the cam cylinder 207 moves in the optical axis direction while being rotated by a driving force output from the gear train 213, the guide cylinder 208 is bayonet-connected to the cam cylinder 207 and rectilinearly moves in the optical axis direction.

Figure 9:
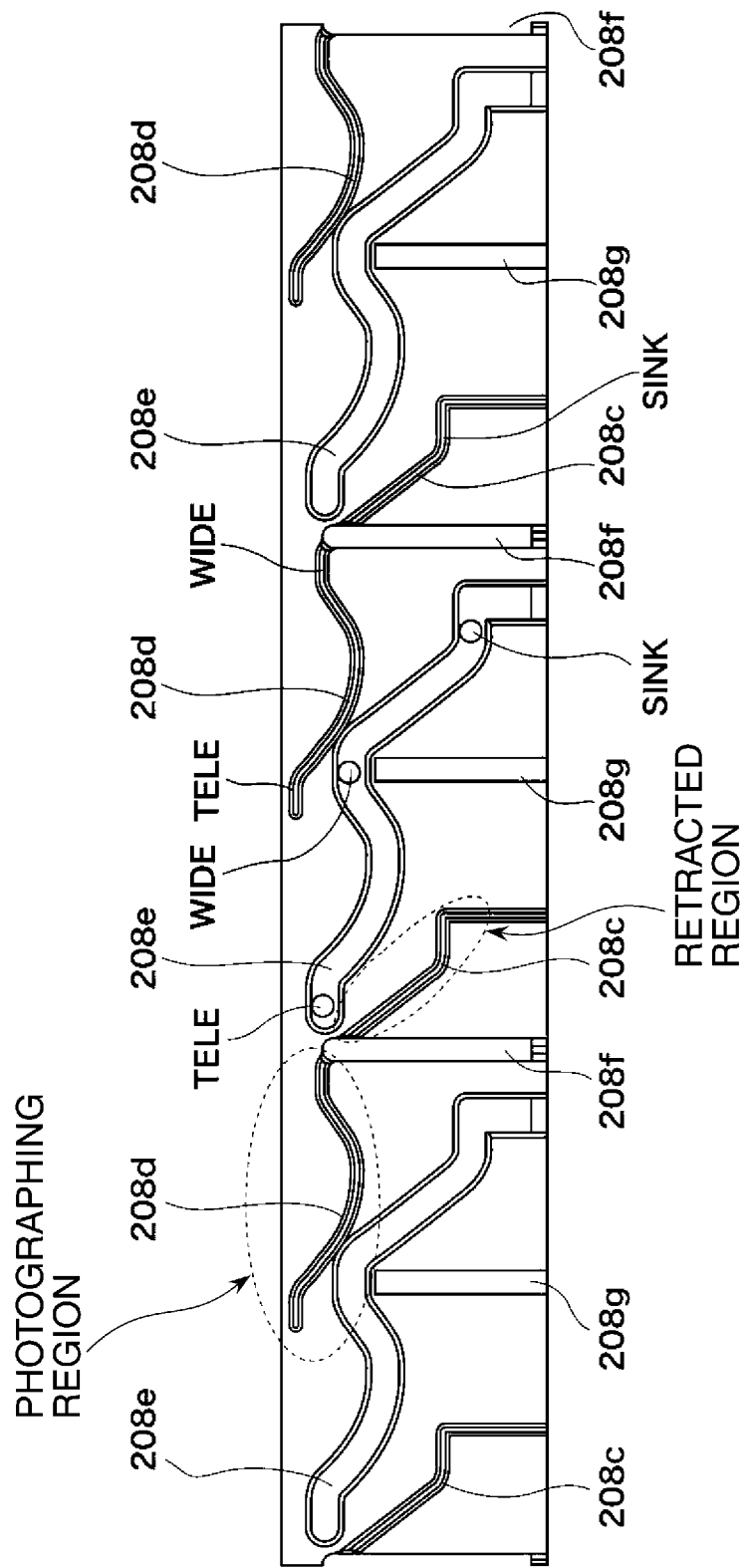
FIG. 9 is a development view of an inner peripheral surface of the first rectilinear guide cylinder.

FIG. 9 shows an inner peripheral surface of the first rectilinear guide cylinder 208 in development view.

Cam grooves (both halves of each cam groove are denoted by 208$c$, 208$d$), which are the same in shape as but different in circumferential phase from the penetration cam grooves 208$e$, and second rectilinear guide grooves 208$g$ extending parallel to the optical axis are formed at circumferentially equal intervals at three places on the inner peripheral surface of the first rectilinear guide cylinder 208. In the following, the cam groove halves 208$c$, 208$d$ will be sometimes referred to as the cam grooves 208$c$, 208$d$.

Figure 15:
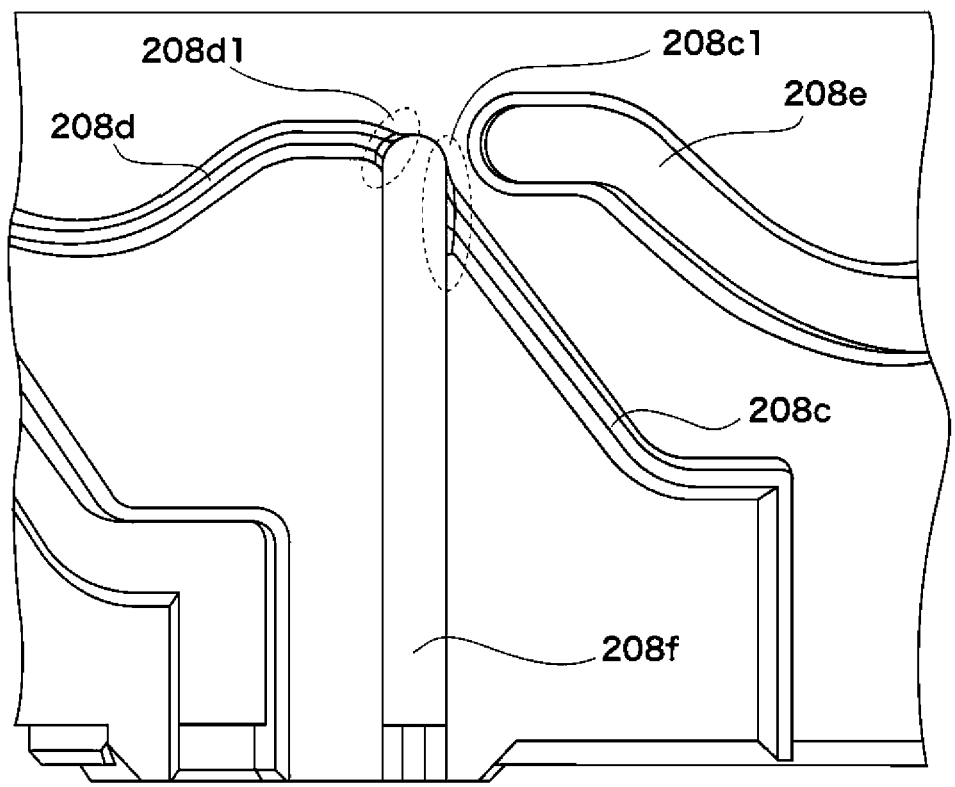
FIG. 15 is an enlarged fragmentary view showing chamfers formed at the cam groove of the first rectilinear guide cylinder.

Each cam groove is divided into two (i.e., cam grooves 208$c$, 208$d$) by a corresponding one of the first rectilinear guide grooves 208$f$. As shown in FIG. 15, chamfers 208$c$1, 208$d$1 are formed at the divided portions of the cam grooves. The first rectilinear guide grooves 208$f$ restrict the second group unit 202, 203 from rotating when the second group unit moves in the optical axis direction.

As shown in FIG. 4, the second group base 203 of the second group unit has three follower pins 203$a$ engaging the second group cam grooves 207$b$ of the first movable cam cylinder 207. Each follower pin 203$a$ has a root 203$b$ that engages a corresponding one of the first rectilinear guide grooves 208$f$ of the first rectilinear guide cylinder 208.

When the first movable cam cylinder 207 moves in the optical axis direction while rotating, the second group unit 202, 203 moves in the optical axis direction to follow the cam grooves 207$b$ of the cam cylinder 207.

As shown in FIGS. 1 and 4, the second movable cam cylinder 209 and the second rectilinear guide cylinder 210 are disposed on the inner periphery side of the first rectilinear guide cylinder 208.

Figure 13:
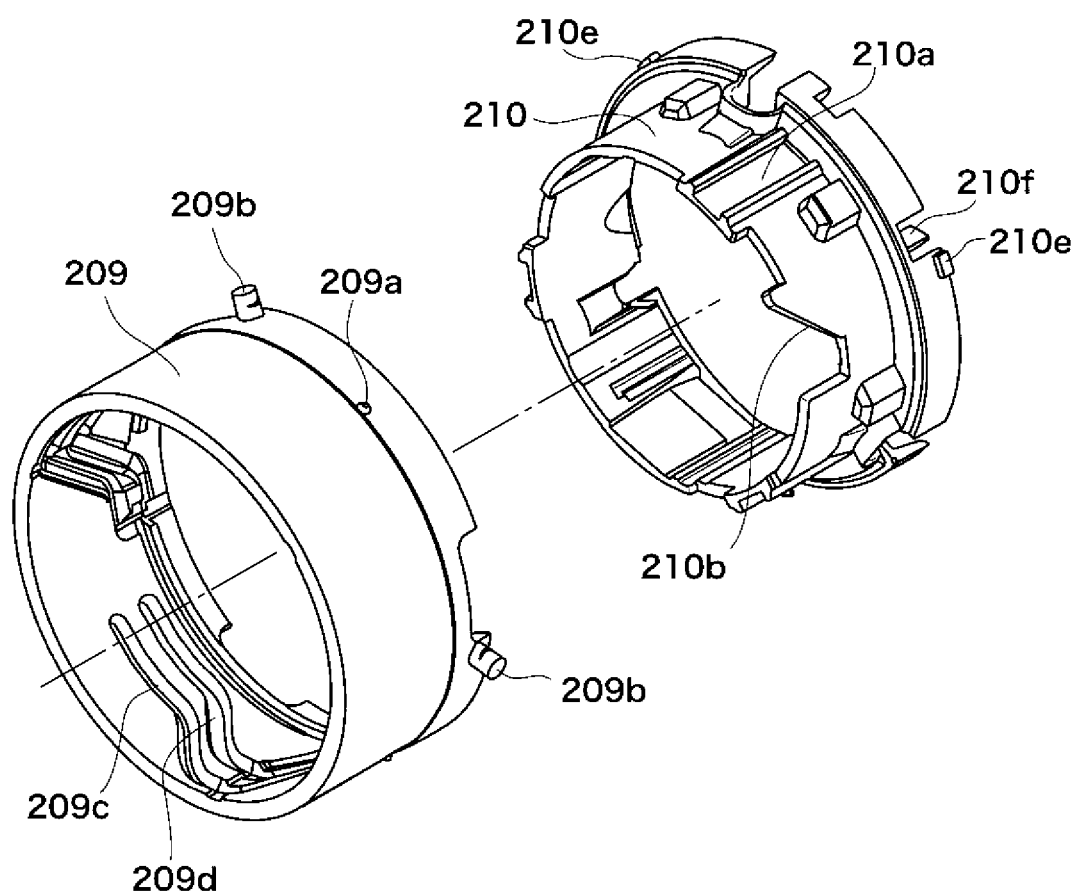
FIG. 13 is an exploded perspective view showing the second movable cam cylinder and a second rectilinear guide cylinder of the lens barrel.

As shown in FIG. 13, follower pins 209$a$ engaging the cam grooves 208$c$, 208$d$ of the first rectilinear guide cylinder 208 and drive pins 209$b$ extending through the penetration cam grooves 208$e$ of the first rectilinear guide cylinder 208 are provided on the outer peripheral surface of the second movable cam cylinder 209. Each follower pin 209$a$ is a taper pin as with follower pins of other cylinders, whereas each drive pin 209$b$ is a circular cylindrical pin. Each follower pin 209$a$ is an example of a first pin of this invention, and each drive pin 209$b$ is an example of a second pin of this invention.

The drive pins 209$b$ engage the rectilinear driving grooves 207$e$ of the first movable cam cylinder 207. With rotation of the cam cylinder 207, the second movable cam cylinder 209 rotates in unison with the cam cylinder 207 and moves in the optical axis direction by engagement between the follower pins 209$a$ of the cam cylinder 209 and the cam grooves 208$c$, 208$d$ of the first rectilinear guide cylinder 208.

As described above, the cam grooves 208$c$ of the first rectilinear guide cylinder 208 are divided from the cam grooves 208$d$ by the guide grooves 208$f$. It is the cam grooves 208$d$ in the photographing region that are engaged with the follower pins 209$a$ of the second movable cam cylinder 209. The cam grooves 208$c$ in the retracted region are each formed to be wider than the corresponding follower pin 209$a$ and are not closely engaged with the follower pins 209$a$.

The penetration cam grooves 208$e$ formed in the first rectilinear guide cylinder 208 each have a width that gradually increases at a position short of a location where the retracted region shifts to the photographing region (WIDE position), so that the cam grooves 208$e$ closely engage the drive pins 209$b$ of the second movable cam cylinder 209 only in the retracted region. In the photographing region where the width of the cam grooves 208$e$ gradually increases to be larger than that of the drive pins 209$b$, the cam grooves 208$e$ do not closely engage the drive pins 209$b$.

Thus, in the retracted region, the drive pins 209$b$ of the second movable cam cylinder 209 are in engagement with the penetration cam grooves 208$e$ of the first rectilinear guide cylinder 208. In the photographing region, the follower pins 209$a$ of the cam cylinder 209 are in engagement with the cam grooves 208$d$ of the guide cylinder 208. In FIG. 9, symbols TELE, WIDE, and SINK denote TELE positions, WIDE positions, and retracted positions of the pins 209$a$, 209$b$.

Figure 10:
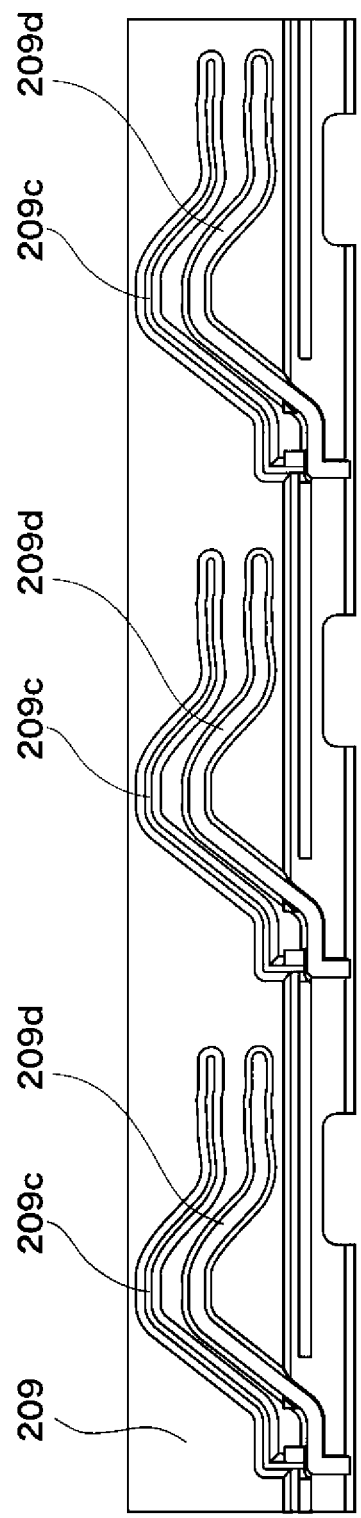
FIG. 10 is a development view of an inner peripheral surface of a second movable cam cylinder of the lens barrel.

FIG. 10 shows an inner peripheral surface of the second movable cam cylinder 209 in development view.

Cam grooves 209$c$, 209$d$ along which the first group barrel 201 is moved in the optical axis direction are formed at circumferentially equal intervals at three places on the inner peripheral surface of the second movable cam cylinder 209. The cam grooves 209c are disposed to be separated from the cam grooves 209d in the optical axis direction.

Inside the second movable cam cylinder 209, there is disposed the second rectilinear guide cylinder 210 so as to be slidable in the rotational direction relative to the second movable cam cylinder 209.

By the sliding contact between the inner peripheral surface of the second movable cam cylinder 209 and the outer peripheral surface of the second rectilinear guide cylinder 210, the cam cylinder 209 and the guide cylinder 210 are relatively rotatable without play in radial direction.

The second movable cam cylinder 209 is bayonet-coupled at its inner peripheral surface to the outer peripheral surface of the second rectilinear guide cylinder 210. When the cam cylinder 209 moves in the optical axis direction while rotating, the guide cylinder 210 moves in the optical axis direction in unison with the cam cylinder 209.

At that time, rectilinear guide keys 210e formed on the outer periphery of the second rectilinear guide cylinder 210 engage the second rectilinear guide grooves 208g formed on the inner peripheral surface of the first rectilinear guide cylinder 208, whereby the second rectilinear guide cylinder 210 is restricted from rotating when it moves in the optical axis direction.

When the second movable cam cylinder 209 starts rotationally moving with rotational movement of the first movable cam cylinder 207, the second rectilinear guide cylinder 210 is bayonet-coupled to the cam cylinder 209 and starts rectilinearly moving in the optical axis direction.

Guide grooves 210a that rectilinearly guide a movement of the first group barrel 201 in the optical axis direction are formed at circumferentially equal intervals at three places on the outer periphery of the second rectilinear guide cylinder 210. A light shield plate 210f (FIG. 13) is formed integrally with the guide cylinder 210 and disposed to be movable to advance to and retreat from a slit portion of the zoom photo interrupter 36.

The light shield plate 210f enters the slit portion of the photo interrupter 36 at the time of lens barrel retraction and retreats from the slit portion in the optical axis direction at the time of lens barrel extension.

Figure 11:
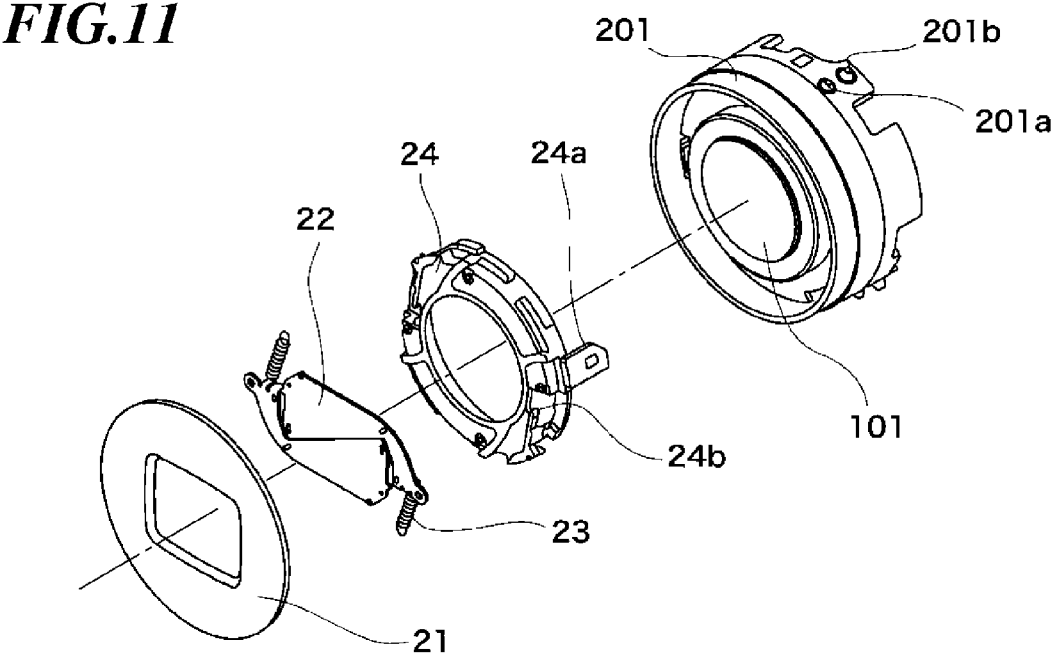
FIG. 11 is an exploded perspective view of a first group barrel of the lens barrel.

As shown in FIGS. 1 and 4, the first group barrel 201 is disposed on the inner periphery side of the second movable cam cylinder 209. As shown in FIG. 11, follower pins 201a, 201b which are the same in circumferential phase as each other but different in shape and in position in the optical axis direction from each other are formed at circumferentially equal intervals at three places on the first group barrel 201. The follower pins 201a are disposed on the object side with respect to the follower pins 201b.

The follower pins 201a are formed integrally with the first group barrel 201 and engaged with the cam grooves 209c of the second movable cam cylinder 209. The follower pins 201b each made of, e.g., a metal pin are press-fitted and fixed to the first group barrel 201, and loosely engaged with the cam grooves 209d of the cam cylinder 209. The cam grooves 209d each having a groove width wider than that of the follower pins 201b do not closely engage the follower pins 201b.

By the engagement between the follower pins 201a and the cam grooves 209c, play between the first group barrel 201 and the cam cylinder 209 in the optical axis direction is eliminated. The follower pins 201b function to enhance the impact resistance, e.g., falling impact resistance.

On an inner peripheral surface of the first group barrel 201, engagement portions (not shown) are formed that engage the rectilinear guide grooves 210a formed on an outer peripheral portion of the guide cylinder 210. These engagement portions function to guide a movement of the first group barrel 201 in the optical axis direction.

When the second movable cam cylinder 209 moves in the optical axis direction while rotating, the first group barrel 201 rectilinearly moves in the optical axis direction without rotating.

Next, with reference to FIG. 11, a lens barrier mechanism attached to the first group barrel 201 will be described.

As shown in FIG. 11, the lens barrier mechanism for closing the photographing opening at non-photographing time to protect the photographing optical system is provided on a front end portion of the first group barrel 201.

The lens barrier mechanism includes barrier blades 22 that protect the photographing optical system, a barrier drive ring 24 that drives the barrier blades 22 in either the closing or opening direction, and barrier springs 23 each coupled at both ends to the corresponding barrier blade 22 and the barrier drive ring 24. On the object side of the barrier blades 22, there is provided a barrier cover 21 which is formed with the photographing opening and which covers the barrier blades 22.

The barrier drive ring 24 is provided with an extension piece 24a extending toward the image surface. When the extension piece 24a is in contact with a reception portion 210b of the second rectilinear guide cylinder 210 (see FIG. 13), the barrier springs 23 urge the barrier blades 22 in the closing direction so that the photographing opening of the barrier cover 21 is closed by the barrier blades 22.

When the extension piece 24a is disengaged from the reception portion 210b of the guide cylinder 210, the barrier drive ring 24 is rotated by the urging forces of the barrier springs 23, and blade contact portions 24b of the barrier drive ring 24 press and urge the barrier blades 22 in the opening direction, whereby the photographing opening of the barrier cover 21 is opened.

Next, a description will be given of extension and storage operations of the lens barrel.

When the lens barrel is in the storage state (retracted state) shown in FIG. 1, the follower pins 201a of the first group barrel 201 engage the cam grooves 209c of the second movable cam cylinder 209.

The second group unit 202, 203 is urged by the springs 35 toward the object side in the optical axis direction, and held in a state pressed against object-side surfaces of the cam grooves 207f formed in the first movable cam cylinder 207.

The photographing opening of the barrier cover 21 of the lens barrier mechanism attached to the first group barrel 201 is closed by the barrier blades 22.

To shift the lens barrel from the storage state to the photographing state, the driving force of the zoom motor 212 is conveyed via the gear train 213 to the gear 211, whereby the first movable cam cylinder 207 is moved and extended in the optical axis direction while being rotated by the engagement between the follower pins 207a of the cam cylinder 207 and the cam grooves 205a of the fixed cam cylinder 205.

At that time, the first rectilinear guide cylinder 208 is bayonet-coupled at the taper pins 208a to the cam grooves 207c of the first movable cam cylinder 207, so that the guide cylinder 208 is supported without play in the optical axis direction and in the radial direction, and rectilinearly moves in unison with the cam cylinder 207, while rotation of the guide cylinder 208 being restricted by the fixed cam cylinder 205.

When the first movable cam cylinder 207 is extended in the optical axis direction, the second group unit 202, 203 rectilinearly moves in the optical axis direction by the engagement between the follower pins 203a of the second group base 203 and the cam grooves 207b of the first movable cam cylinder 207, while being rectilinearly guided by the first rectilinear guide cylinder 208.

With the extending operation of the first movable cam cylinder 207, the second movable cam cylinder 209 is extended in the optical axis direction and moves in the retracted region, while rotating, by the engagement between the drive pins 209b of the cam cylinder 209 and the penetration cam grooves 208e of the first rectilinear guide cylinder 208.

In FIG. 7, reference numeral 209b1 denotes positions of the drive pins 209b of the second movable cam cylinder 209 (which is in the retracted position) in the driving grooves 207e of the first movable cam cylinder 207. All the three drive pins 209b at the illustrated positions are in engagement with respective ones of the driving grooves 207e.

Figure 14A:
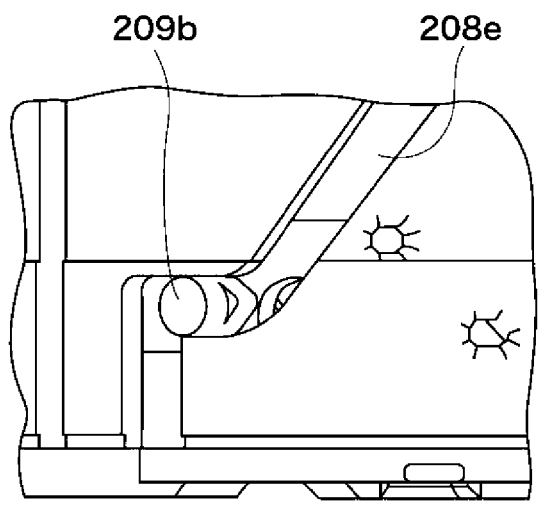
FIGS. 14A and 14C are views each showing a state of engagement between a drive pin of the second movable cam cylinder and a penetration cam groove of the first rectilinear guide cylinder.
Figure 14C:
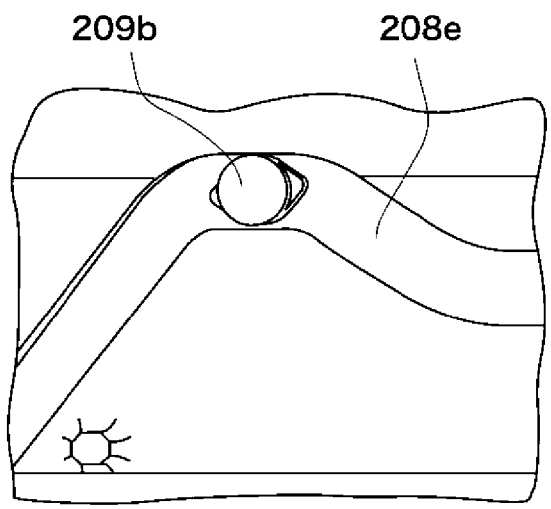
Figure 14B:
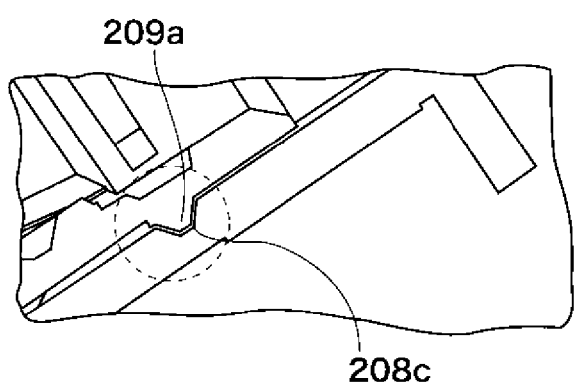
FIGS. 14B and 14D are views each showing a state of engagement between a follower pin and a cam groove of the first rectilinear guide cylinder.

As shown in FIG. 14B, the follower pins 209a of the second movable cam cylinder 209 in the retracted region are not closely engaged with the cam grooves 208c of the first rectilinear guide cylinder 208.

On the other hand, as shown in FIG. 14A, the drive pins 209b are engaged with the penetration cam grooves 208e in the optical axis direction, but not restricted in the radial direction. Thus, there is play in the radial direction between the first rectilinear guide cylinder 208 and the second movable cam cylinder 209. In the retracted region which is a non-photographing region, some play between the guide cylinder 208 and the cam cylinder 209 does not pose a problem. By allowing radial play, a load in driving the lens barrel at the time of barrel retraction can be reduced.

As shown in FIG. 7, the driving grooves 207e of the first movable cam cylinder 207 are connected with respective ones of the groove portions 207d1, 207d3, 207d5 of the cam cylinder 207. When the second movable cam cylinder 209 is extended from the retracted state, each drive pin 209b passes through a corresponding one of the connections between the driving grooves 207e and the groove portions 207d1, 207d3, 207d5.

Since the groove portions 207d1, 207d3, 207d5 are at different positions in the optical axis direction, when one of the drive pins 209b passes through the connection between corresponding ones of the driving grooves 207e and the groove portions 207d1, 207d3, and 207d5, the other two drive pins 209b are in stable engagement with the driving grooves 207e at places other than their corresponding connections, and therefore, the zoom operation is not adversely affected In the WIDE state and in the TELE state, the drive pins 209b of the second movable cam cylinder 209 are at the positions denoted by reference numerals 209b2 and 209b3 in FIG. 7. In other words, all the three drive pins 209b in the photographing region are in stable engagement with the driving grooves 207e, and a smooth zoom operation can be performed.

Since the cam grooves 208c of the first rectilinear guide cylinder 208 are divided from the cam grooves 208d by the first rectilinear guide grooves 208f at locations short of the WIDE position, the follower pins 209a are disengaged from the cam grooves 208c when the second movable cam cylinder 209 moves in the optical axis direction while rotating. When the cam cylinder 209 further moves in the optical axis direction, the follower pins 209a enter the cam grooves 208d.

Figure 14D:
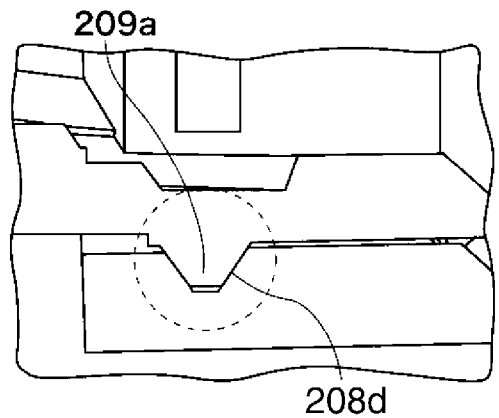

In the photographing region, the width of the penetration cam grooves 208e becomes gradually wide, and the drive pins 209b are no longer closely engaged with the penetration cam grooves 208e as shown in FIG. 14C. On the other hand, the follower pins 209a closely engage the cam grooves 208d as shown in FIG. 14D, and the second movable cam cylinder 209 is held in the photographing region (WIDE position) (FIG. 2).

As shown in FIG. 15, the chamfers 208d1 are formed at locations where the cam grooves 208d are divided from the cam grooves 208c, and therefore, the follower pins 209a can enter the cam grooves 208d without being caught, so that a smooth zoom operation can be achieved.

Since each of the follower pins 209a is a taper pin, the follower pins 209a closely engage the cam grooves 208d in a photographing state, so that the second movable cam cylinder 209 is held without play relative to the first rectilinear guide cylinder 208 in the optical axis direction and in the radial direction.

The second rectilinear guide cylinder 210 is bayonet-coupled to the second movable cam cylinder 209 and rotation of the guide cylinder 210 is restricted by the engagement between the rectilinear guide keys 210e and the second rectilinear guide grooves 208g formed in the first rectilinear guide cylinder 208. Accordingly, when the cam cylinder 209 moves in the optical axis direction while rotating, the guide cylinder 210 rectilinearly moves in the optical axis direction in unison with the cam cylinder 209 and is then held at the WIDE position.

When the second movable cam cylinder 209 is extended in the optical axis direction, the first group barrel 201 rectilinearly moves in the optical axis direction by the engagement between the follower pins 201a and the cam grooves 209c of the cam cylinder 209 so as to be relatively separated from the second rectilinear guide cylinder 210, while being rectilinearly guided by the rectilinear guide grooves 210a of the guide cylinder 210.

When the lens barrel is in a retracted state, the extension piece 24a of the barrier drive ring 24 of the lens barrier mechanism provided in the first group barrel 201 is in contact with the reception portion 210b of the second rectilinear guide cylinder 210. With movement of the first group barrel 201 away from the guide cylinder 210, the extension piece 24a is disengaged from the reception portion 210b, and an urging force of the barrier spring 23 is released, whereby the barrier drive ring 24 rotates to open the barrier blades 22. The first group barrel 201 further moves in the optical axis direction and is held at the WIDE position (FIG. 2).

The position to which the first lens group 101 has been extended relative to the CCD sensor 104 is decided as the sum of an amount of forward movement (i.e., amount of movement toward the object side in the optical direction) of the first rectilinear guide cylinder 208, an amount of forward movement of the second movable cam cylinder 209, and an amount of cam extension of the cam cylinder 209.

The position to which the second lens group 102 has been extended relative to the CCD sensor 104 is decided as the sum of an amount of forward movement of the first movable cam cylinder 107 and an amount of cam extension of the cam cylinder 107.

When the zoom motor 212 is driven from the WIDE state corresponding to the photographing region, the first group barrel 201 that holds the first lens group 101 and the second group unit 202, 203 that holds the second lens group 102 move along the optical axis as previously described, and a TELE state shown in FIG. 3 is established.

The cam grooves 208d (FIG. 9) of the first rectilinear guide cylinder 208 are formed on the inner peripheral surface of the regions Y (FIG. 8) of the guide cylinder 208. Since the taper pins 208a are disposed on the back side of the cam grooves 208d (i.e., on the outer peripheral surface of the guide cylinder 208), the inclination of the second movable cam cylinder 209 relative to the first movable cam cylinder 207 is small.

Thus, the inclination of the first lens group 101 of the first group barrel 201 that engages the second movable cam cylinder 209 relative to the second lens group 102 of the second group unit 202, 203 that engages the first movable cam cylinder 207 is also small.

In the photographing region from WIDE position to TELE position, the AF motor 34 is driven according to the distance to object, whereby the third group barrel 204 that holds the third lens group 103 is moved in the optical axis direction for focusing.

In a case that the power supply is turned off, the zoom motor 212 rotates reversely and a storage operation is performed reversely to the extension operation so that the lens barrel is moved to the retracted position. During the movement to the retracted position, the follower pins 209a of the second movable cam cylinder 209 are disengaged from the cam grooves 208d and enter the cam grooves 208c so that a retracted state is established.

Since the chamfers 208c1 are formed at the portions where the cam grooves 208c are divided from the cam grooves 208d, the follower pins 209a can enter the cam grooves 208c without being caught, whereby a smooth barrel retraction can be achieved.

Next, a description will be given of an example of driving control for zoom operation of the lens barrel in this embodiment.

When power supply is turned on, a control unit (not shown) determines whether the lens barrel is in a retracted position. The control unit determines that the lens barrel is in a retracted position, if the control unit does not detect a signal output from the photo interrupter 36 when the light shield plate 210f provided on the second rectilinear guide cylinder 210 retreats from a slit of the photo interrupter 36 fixed to the CCD holder 206.

If the lens barrel is in a retracted position, the control unit drives the zoom motor 212 to start a zoom operation. As a result, the driving force of the zoom motor 212 is conveyed from a gear (not shown) fixed to the motor shaft to the first movable cam cylinder 207 via the gear train 213 and the gear 211, so that the cam cylinder 207 rotates.

Next, the control unit determines whether the first lens group 101 has been moved to a zoom reset position by determining whether the light shield plate 210f of the second rectilinear guide cylinder 210 retreats from the slit of the photo interrupter 36.

Specifically, in a case where the control unit detects a signal output from the photo interrupter 36 when the light shield plate 210f retreats from the slit of the photo interrupter 36, the control unit detects that the first lens group 101 has been moved to the zoom reset position.

If the signal indicating that the light shield plate 210f retreated from the slit of the photo interrupter 36 has not been detected before elapse of a predetermined time period, the control unit determines that the first lens group 101 has not been moved to the zoom reset position, and performs error processing.

The gear (not shown) fixed to the motor shaft of the zoom motor 212 is integrally formed with three blades that pass through the slits of the two photo interrupters 38, 39.

The control unit converts a signal output when the passage of the blades is detected by the two photo interrupters into pulses, and counts the pulses to thereby detect the number of revolutions of the zoom motor 212.

Information representing the number of revolutions of the zoom motor 212 from a zoom reset position of the lens barrel to a zoom stop position thereof such as WIDE position or TELE position is stored beforehand in a memory.

When it is determined that the lens barrel has been driven to the zoom reset position, a zoom count is reset and the lens barrel is moved to the WIDE position. Subsequently, the third group barrel 204 is caused to start moving to a focus reset position.

With the movement of the third group barrel 204, the light shield plate 204b of the barrel 204 retreats from the slit of the focus photo interrupter 37, and a change occurs in the output signal of the photo interrupter 37.

If the output signal of the photo interrupter 37 does not change before elapse of a predetermined time period, the control unit determines that some trouble has occurred and performs an error process. If the output signal of the photo interrupter 37 changes before elapse of the predetermined time period, the control unit determines that the third group barrel 204 has reached the focus reset position. Subsequently, the third group barrel 204 reaches a WIDE standby position and a photographing preparation is completed.

A stable optical performance can be attained even in the construction including a large number of cylinders since only the first group barrel 201 is interposed between the first lens group 101 and the second rectilinear guide cylinder 210 during the series of zoom operations and the light shield plate 210f for detection of the zoom reset position is provided in the guide cylinder 210.

As described above, in the embodiment, the cam grooves 208d used in the photographing region and the penetration cam grooves 208e used in the retracted region are formed in the first rectilinear guide cylinder 208, and the follower pins 209a engaging the cam grooves 208d and the drive pins 209b engaging the penetration cam grooves 208e are formed in the second movable cam cylinder 209.

Accordingly, the second movable cam cylinder 209 can be driven using the penetration cam grooves 208e at places where the cam grooves 208c are divided from the cam grooves 208d by the first rectilinear guide grooves 208f, whereby the lens barrel able to perform a smooth zoom operation can be obtained.

Since the cam grooves 208c are divided from the cam grooves 208d at a boundary between the retracted region and the photographing region, the optical performance at the time of photographing is not adversely affected, and therefore the highly reliable lens barrel can be obtained.

This invention is not limited in construction to the example described in the embodiment, and various changes and modifications may be made in terms of material, shape, size, form, number, installation position, etc. without departing from the spirit and scope of the invention.

For example, in the above embodiment, a case has been described where the first group barrel 201 that holds the first lens group 101 and the second group unit 202, 203 that holds the second lens group 102 are moved in the optical axis direction by the cam engagement. Alternatively, the first group barrel and the second group unit can be moved in the optical axis direction by a helicoid mechanism.

In the above embodiment, the zoom lens barrel consisting of three groups has been described. However, the present invention is applicable to a zoom lens barrel consisting of two or four groups.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-188426, filed Aug. 17, 2009, which is hereby incorporated by reference herein in its entirety.

What is claimed is:

1. A lens barrel comprising:
   a rectilinear guide cylinder configured to rectilinearly move in an optical axis direction of the lens barrel, said rectilinear guide cylinder having a first cam groove formed on an inner peripheral surface thereof, a second cam groove formed on the inner peripheral surface thereof, and a rectilinear guide groove extending in the optical axis direction and dividing the first cam groove at a boundary region between a retracted region and a photographing region; and
   a movable cam cylinder configured to move in the optical axis direction while rotating relative to said rectilinear guide cylinder, said movable cam cylinder having a first pin that engages the first cam groove and a second pin that engages the second cam groove,
   wherein the first cam groove in the retracted region is larger in width than the first pin, and the first cam groove in the retracted region is larger in width than the first cam groove in the photographing region, whereas the second cam groove in the photographing region is larger in width than the second pin, and the second cam groove in the photographing region is larger in width than the second cam groove in the retracted region, and
   wherein said movable cam cylinder moves in the photographing region while the first pin engages the first cam groove, and moves in the retracted region while the second pin engages the second cam groove.

2. The lens barrel according to claim 1, wherein a chamfer is formed at a portion of the first cam groove where the first cam groove is divided by the rectilinear guide groove.

3. The lens barrel according to claim 1, wherein the first pin is a taper pin, and the second pin is a circular cylindrical pin.

4. An image pickup apparatus comprising the lens barrel as set forth in claim 1.

5. The lens barrel according to claim 1, wherein said movable cam cylinder moves in the photographing region without the second pin engaged with the second cam groove.

6. The lens barrel according to claim 1, wherein said movable cam cylinder moves in the retracted region without the first pin engaged with the first cam grooved.

* * * * *